United States Patent
Duga et al.

(10) Patent No.: US 6,351,750 B1
(45) Date of Patent: Feb. 26, 2002

(54) DYNAMIC CONVERSION OF BYTE ORDERING FOR USE ON DIFFERENT PROCESSOR PLATFORMS

(75) Inventors: Brady Duga, Carlsbad; Andrew Marder, San Diego; Garth Conboy, La Jolla, all of CA (US)

(73) Assignee: Softbook Press, Inc., Menlo Park, CA (US)

( * ) Notice: Subject to any disclaimer, the term of this patent is extended or adjusted under 35 U.S.C. 154(b) by 0 days.

(21) Appl. No.: 09/174,072

(22) Filed: Oct. 16, 1998

(51) Int. Cl.⁷ .............................................. G06F 17/00
(52) U.S. Cl. ...................................... 707/102; 712/300
(58) Field of Search .............................. 707/100, 102, 707/101; 712/300

(56) References Cited

U.S. PATENT DOCUMENTS

| | | |
|---|---|---|
| 3,718,906 A | 2/1973 | Lightner |
| 4,159,417 A | 6/1979 | Rubincam |
| D276,626 S | 12/1984 | Lockwood |
| 4,490,810 A | 12/1984 | Hon |
| 4,545,023 A | 10/1985 | Mizzi |
| 4,575,621 A | 3/1986 | Dreifus |
| 4,591,974 A | 5/1986 | Dornbush et al. |
| 4,597,058 A | 6/1986 | Izumi et al. |
| 4,601,011 A | 7/1986 | Grynberg |
| 4,649,499 A | 3/1987 | Sutton et al. |
| D289,777 S | 5/1987 | Thomas |
| 4,682,161 A | 7/1987 | Bugg |
| 4,725,977 A | 2/1988 | Izumi et al. |
| 4,779,080 A | 10/1988 | Coughlin et al. |
| 4,820,167 A | 4/1989 | Nobles et al. |
| 4,855,725 A | 8/1989 | Fernandez |
| 4,899,292 A | 2/1990 | Montagna et al. |
| 4,916,441 A | 4/1990 | Gombrich |
| 4,918,632 A | 4/1990 | York |
| 4,972,496 A | 11/1990 | Sklarew |

(List continued on next page.)

FOREIGN PATENT DOCUMENTS

| | | | |
|---|---|---|---|
| EP | 0 390 611 | 3/1990 | |
| EP | 0 751 655 A2 | 1/1997 | |
| FR | 2 657 451 | 1/1990 | |
| FR | 2 657 187 | 7/1991 | |
| GB | 2 149 544 | 6/1995 | |
| JP | 07 219823 A | 12/1995 | |
| WO | WO 87/01481 | 3/1987 | |
| WO | WO 89/05023 | 6/1989 | |
| WO | 94/15269 | * 7/1994 | ............ G06F/13/40 |
| WO | 97/14101 | * 4/1997 | ............ G06F/13/40 |
| WO | WO 97/20274 | 6/1997 | |
| WO | WO 9806034 | 12/1998 | |

OTHER PUBLICATIONS

James "Multiplexed Buses: The Endian Wars Continue", IEEE 1990, pp. 9–21.*

(List continued on next page.)

Primary Examiner—Thomas Black
Assistant Examiner—Uyen Le
(74) Attorney, Agent, or Firm—Townsend and Townsend and Crew LLP

(57) ABSTRACT

The invention is a method for dynamically converting the byte-ordering of a data structure of a resource type from a first format to a second format, the first format being incompatible with the second format. The method comprises the following steps: (a) creating a template which corresponds to the data structure of the resource type, the template having a structure in a third format which is compatible with the first and second formats; (b) linking the template to the resource type; and (c) converting automatically the byte-ordering of the data structure of the resource type from the first format to the second format using the template.

9 Claims, 4 Drawing Sheets

U.S. PATENT DOCUMENTS

| | | | | |
|---|---|---|---|---|
| 4,985,697 | A | 1/1991 | Boulton | |
| 5,021,989 | A | 6/1991 | Fujisawa et al. | |
| 5,025,373 | A | 6/1991 | Keyser, Jr. et al. | |
| 5,031,119 | A | 7/1991 | Dulaney et al. | |
| 5,065,345 | A | 11/1991 | Knowles et al. | |
| 5,091,939 | A | 2/1992 | Cole et al. | |
| 5,107,415 | A * | 4/1992 | Sato et al. | 395/800 |
| 5,109,354 | A | 4/1992 | Yamashita et al. | |
| 5,115,508 | A | 5/1992 | Hatta | |
| 5,121,492 | A | 6/1992 | Saville, III et al. | |
| 5,133,076 | A | 7/1992 | Hawkins et al. | |
| 5,146,552 | A | 9/1992 | Cassorla et al. | |
| D330,544 | S | 10/1992 | Kane | |
| 5,157,491 | A | 10/1992 | Kassatly | |
| 5,157,737 | A | 10/1992 | Sklarew | |
| 5,157,783 | A | 10/1992 | Anderson et al. | |
| 5,199,104 | A | 3/1993 | Hirayama | |
| 5,203,001 | A | 4/1993 | Yanagiuchi et al. | |
| 5,214,696 | A | 5/1993 | Keiser, II et al. | |
| 5,221,838 | A | 6/1993 | Gutman et al. | |
| 5,222,136 | A | 6/1993 | Rasmussen et al. | |
| 5,226,080 | A | 7/1993 | Cole et al. | |
| 5,231,662 | A | 7/1993 | van Rumpt et al. | |
| 5,233,333 | A | 8/1993 | Borsuk | |
| 5,239,665 | A | 8/1993 | Tsuchiya | |
| D339,329 | S | 9/1993 | Lacko | |
| 5,245,656 | A | 9/1993 | Loeb et al. | |
| 5,247,661 | A | 9/1993 | Hager et al. | |
| 5,253,294 | A | 10/1993 | Maurer | |
| 5,265,259 | A * | 11/1993 | Satou et al. | 712/300 |
| D346,620 | S | 5/1994 | McSorely | |
| 5,319,582 | A | 6/1994 | Ma | |
| 5,333,116 | A | 7/1994 | Hawkins et al. | |
| 5,339,091 | A | 8/1994 | Yamazaki et al. | |
| 5,359,707 | A | 10/1994 | Sato | |
| 5,365,598 | A | 11/1994 | Sklarew | |
| 5,367,621 | A | 11/1994 | Cohen et al. | |
| 5,379,057 | A | 1/1995 | Clough et al. | |
| 5,388,196 | A | 2/1995 | Pajak et al. | |
| 5,392,387 | A | 2/1995 | Friztpatrick et al. | |
| 5,398,310 | A | 3/1995 | Tchao et al. | |
| 5,404,505 | A | 4/1995 | Levinson | |
| D359,306 | S | 6/1995 | Lande et al. | |
| 5,428,606 | A | 6/1995 | Moskowitz | |
| 5,438,344 | A | 8/1995 | Oliva | |
| D362,271 | S | 9/1995 | Luong | |
| D362,272 | S | 9/1995 | Luong | |
| D362,461 | S | 9/1995 | Luong | |
| 5,457,746 | A | 10/1995 | Dolphin | |
| 5,463,725 | A | 10/1995 | Henckel et al. | |
| 5,465,213 | A | 11/1995 | Ross | |
| 5,467,102 | A | 11/1995 | Kuno et al. | |
| 5,475,399 | A | 12/1995 | Borsuk | |
| 5,477,510 | A | 12/1995 | Ukita | |
| 5,483,586 | A | 1/1996 | Sussman | |
| 5,557,790 | A | 9/1996 | Bingham et al. | 395/600 |
| 5,594,919 | A * | 1/1997 | Turkowski | 712/300 |
| 5,598,470 | A | 1/1997 | Cooper et al. | |
| 5,615,264 | A | 3/1997 | Kazmierczak et al. | |
| 5,629,980 | A | 5/1997 | Stefik et al. | |
| 5,638,443 | A | 6/1997 | Stefik et al. | |
| 5,697,793 | A | 12/1997 | Huffman et al. | |
| 5,719,943 | A | 2/1998 | Amada et al. | |
| 5,734,823 | A | 3/1998 | Saigh et al. | |
| 5,734,891 | A | 3/1998 | Saigh | |
| 5,781,763 | A * | 7/1998 | Beukema et al. | 710/22 |
| 5,828,884 | A * | 10/1998 | Lee et al. | 395/705 |
| 5,919,117 | A * | 10/1998 | Hansen | 712/300 |
| 5,903,779 | A * | 5/1999 | Park | 712/300 |
| 5,907,865 | A * | 5/1999 | Moyer | 711/201 |
| 5,918,075 | A * | 6/1999 | Paysan | 712/300 |
| 5,961,640 | A * | 10/1999 | Chambers et al. | 712/300 |
| 6,021,275 | A * | 2/2000 | Horwat | 395/707 |

OTHER PUBLICATIONS

Nadeau et al "Image Handling in a Multi–vendor Environment", IEEE 1991, pp. 276–283.*

Dvorak, et al. Methodology for User Centred Link Structures for Textbook to Hypertext Conversion, IEEE, Jan. 1992, pp. 619–628.

Pobiak Adjustable Access Electronic Books, IEEE, Jan. 1992, pp. 90–94.

Ramos *Making Book on Electronic Books*, College Store Journal—Sep./Oct. 1992.

Cox *Technology Threatens to Shatter the World of College Textbooks* The Wall Street Journal—Electronic Campus, Jun. 1, 1993

Watanabe et al., Visual Interface for Retrieval of Electronic–Formed Books, IEEE, Jul. 1993, pp. 692–695.

The Heller Report, Oct. 1993.

Ziegler *IBM to Unveil Plan to Skip Disks, Send Software by Satellite*, The Wall Street Journal, Nov. 1, 1994.

Fisher *This Little Compute rTries to be a Book*, St. Louis Post–Dispatch, Jan. 4, 1995.

Steinert–Threlkeld *Now, Data by Satellite*, Inter@ctive Week (no date).

* cited by examiner

| VALUE | DESCRIPTION |
|---|---|
| Byte (1) | A single byte - don't perform swapping |
| Short (2) | A 2 byte integer - swap the next 2 bytes |
| Long (3) | A 4 byte integer - swap the next 4 bytes |
| Short Align (4) | If necessary, insert a pad character to align on a 2-byte boundary. Do not perform swapping on this data. |
| Long Align (5) | If necessary, add enough padding to put the next value on a 4 byte boundary (adds up to 3 pad bytes). Do not perform swapping on this data. |
| Null terminated string (6) | The following data is a stream of bytes, ending on a NULL (0) byte. Perform no byte swapping. |
| Short counted string (7) | The following data is a 2-byte integer (count), followed by count bytes. Swap the next 2 bytes, but do not swap the count bytes following. |
| Byte counted string (8) | The following data is a 1-byte integer (count), followed by count bytes. Do not swap this data. |

Fig. 3A

| VALUE | DESCRIPTION |
| --- | --- |
| Short point (9) | The following 4 bytes is a pair of 2 byte numbers. Swap them as if they were 2 2-byte integers. |
| Long point (10) | The following 8 bytes is a pair of 4 byte numbers. Swap them as if they were 2 4-byte integers. |
| Indefinite list (11) | The remaining data in the resource is a list of structures. All elements remaining in the template will describe the structure of a single list element. No data is swapped or skipped. |
| Begin short counted list (13) | The next 2 bytes are a count for a list. All following data in the template until "End list" is treated as the layout for a single list element. The first 2 bytes (count) are swapped, and then count list elements are swapped as specified by the list element template. |
| Begin long counted list (14) | Same as a short counted list, but the count is 4 bytes. |
| End list (12) | Identifies the end of a counted list (either short or long count). Does not correspond to actual data, thus performing no byte swapping. |

Fig. 3B

DYNAMIC CONVERSION OF BYTE ORDERING FOR USE ON DIFFERENT PROCESSOR PLATFORMS

BACKGROUND OF THE INVENTION

1. Field of the Invention

The present invention relates generally to a distribution system of digital contents, i.e., digitally encoded published materials. More particularly, the invention relates to a method for dynamically converting the byte-ordering of a data structure in a digital content from one format to a different format.

2. Description of Related Art

Advances in computer and communication technology have provided the consumers a convenient and economical means to access information in a variety of media. One particular area of information access is the electronic books. An electronic book is a viewing device that receives printed materials in the form of digital data downloaded from an information network. A user of an electronic book can read downloaded contents of books and printed materials subscribed from a participating bookstore at his or her own convenience without the need to purchase the printed copies of the books.

An electronic book, or any other viewing device, has persistent memory, such as a hard disk or a flash random-access-memory (RAM), to store the downloaded digital contents and constitutes a particular processor platform.

Digital contents stored as binary data in persistent memory of a viewing device must be readable in the native byte-ordering format of the processor of the viewing device. For performance reasons, certain processors require the byte-ordering of numeric values to be in specific formats. These formats may be different for different types of processors. For example, for use on a Motorola 680x0 chip, the 2-byte hexadecimal number 3AF7 is stored in RAM as: 3A in byte 1, F7 in byte 2. For use on an Intel processor, the same number is stored in RAM as: F7 in byte 1, 3A in byte 2. The Motorola chip format is called big endian format, and the Intel chip format is called little endian format. The conversion of raw numerical data from one format to the other is further complicated by the fact that the byte-swapping must depend on individual data element sizes. Without knowing the individual data element sizes, it is not possible to convert raw binary numerical data from one format to the other. For instance, two 2-byte numbers are indistinguishable from one 4-byte number. Consider the big endian data ABCD where A, B, C and D are bytes. This data may be two 2-byte numbers, namely, AB and CD, or it may be a single 4-byte number ABCD. Since byte swapping must be done for individual numbers, the resulting little endian data are either BADC if the big endian data are two 2-byte numbers, or DCBA if the big endian data is a single 4-byte number.

For optimal performance, binary data should be stored in the endian format of the final target processor platform for which it is created. However, this is not possible if there is more than one target processor platform and the platforms are not compatible. For example, in a digital content distribution system which includes a virtual bookstore and two different groups of viewing devices which run on two incompatible types of processors, a digital content stored in one endian format at the virtual bookstore can be directly used by one group of viewing devices, but must be converted to a different endian format to be used by the other group. Performing conversion of byte-ordering at the viewing device level is time-consuming and prone to errors, specially when the data structure has a complex combination of data types and contains nested lists of other structures. In addition, a change to a data structure will require every user of that structure to change its conversion.

Therefore, currently, there is a need for an efficient method to dynamically convert the byte-ordering of a data structure from one endian format to another endian format for use on a different processor platform.

SUMMARY OF THE INVENTION

The present invention is a method for dynamically converting the byte-ordering of a data structure of a resource type from a first format to a second format, the first format being incompatible with the second format. The method comprises the following steps: (a) creating a template which corresponds to the data structure of the resource type, the template having a structure in a third format which is compatible with the first and second formats; (b) linking the template to the resource type; and (c) converting automatically the byte-ordering of the data structure of the resource type from the first format to the second format using the template.

BRIEF DESCRIPTION OF THE DRAWINGS

FIG. 3 is a table describing some values of the template used in the present invention.

DETAILED DESCRIPTION OF THE INVENTION

The present invention is a method and system for dynamically converting the byte-ordering of a data structure of a resource type from a first format to a second format which is incompatible with the first format. The method includes the steps of creating a template having a structure which corresponds to the data structure of the resource type, the template structure being in a third format which is compatible with the first and second formats, linking the template structure to the resource type, and automatically converting the byte-ordering of the data structure of the resource type from the first format to the second format using the template structure.

In the following description, for purposes of explanation, numerous details are set forth in order to provide a thorough understanding of the present invention. However, it will be apparent to one skilled in the art that these specific details are not required in order to practice the present invention.

Figure 1:
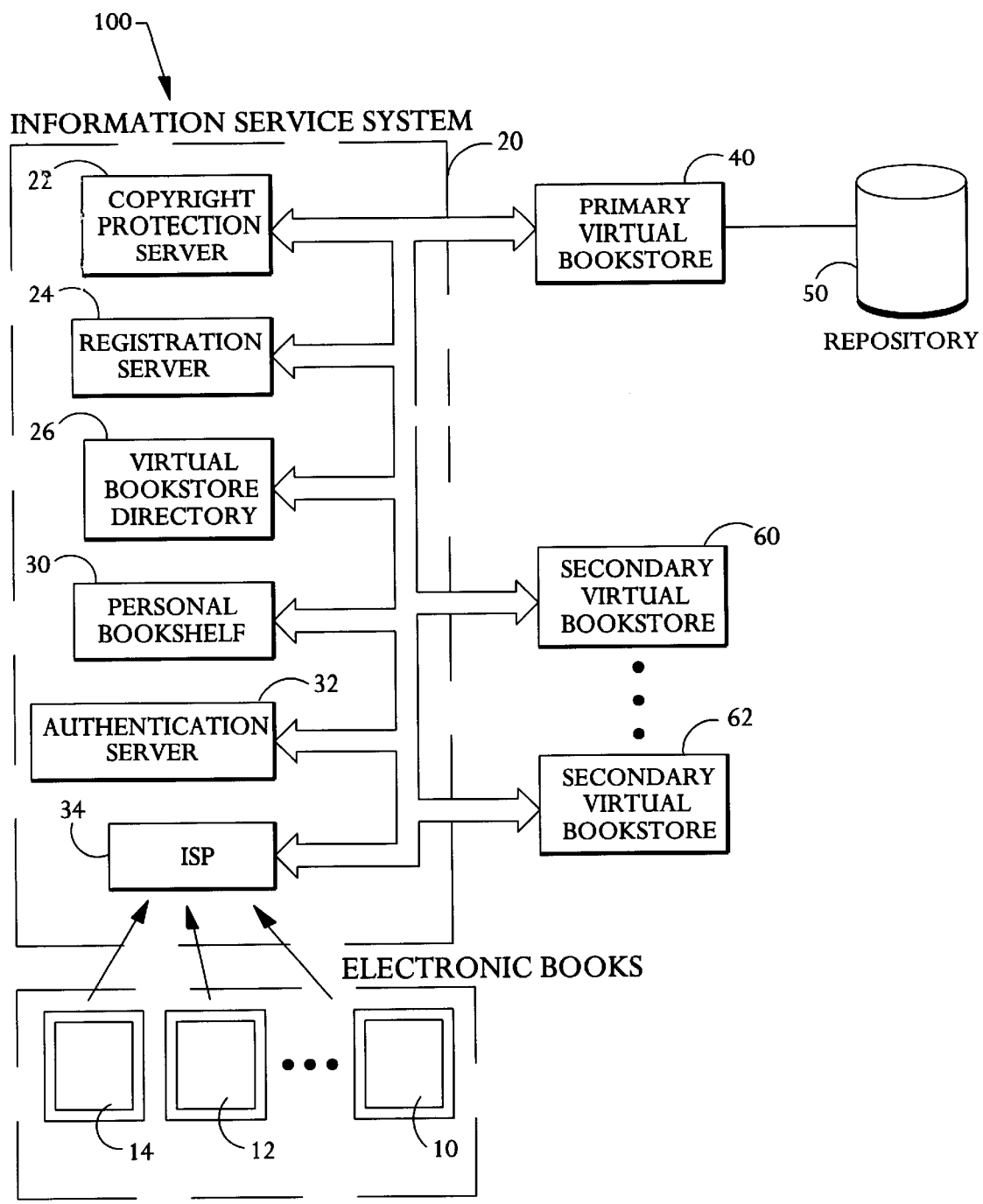
FIG. 1 is a diagram illustrating a system in which the present invention can be practiced.

FIG. 1 is a diagram illustrating a system 100 in which one embodiment of the invention can be practiced.

Referring to FIG. 1, the system 100 comprises: (a) at least one portable electronic book 10 operative to request a digital content from a catalog of distinct digital contents, to receive and display the requested digital content in readable form; (b) an information services system 20 which includes an authentication server 32 for authenticating the identity of the requesting portable electronic book 10 and a copyright protection server 22 for rendering the requested digital content sent to the requesting portable electronic book 10 readable only by the requesting portable electronic book 10; (c) at least one primary virtual bookstore 40 in electrical communication with the information services system 20, the primary virtual bookstore being a computer-based storefront accessible by the portable electronic book and including the catalog of distinct digital contents; and (d) a repository 50, in electrical communication with the primary virtual bookstore 40, for storing the distinct digital contents listed in the catalog.

The system 100 preferably includes more than one portable electronic book 10, to be commercially viable. This is illustrated in FIG. 1 by including the portable electronic books 12 and 14. The system also preferably includes more than one primary virtual bookstore 40, each serving a different set of customers, each customer owning a portable electronic book.

The system 100 can further comprise a secondary virtual bookstore 60 in electrical communication with the information services system 20. In this case, the information services system 20 also includes a directory of virtual bookstores 26 in order to provide the portable electronic book 10 with access to the secondary virtual bookstore 60 and its catalog of digital contents.

The information services system 20 can optionally include a notice board server for sending messages from one of the virtual bookstores, primary or secondary, to a portable electronic book in the system.

The information services system 20 also includes a registration server 24 for keeping track of the portable electronic books that are considered active accounts in the system and for ensuring that each portable electronic book is associated with a primary virtual bookstore in the system. In the case where the optional notice board server is included in the information services system 20, the registration server 24 also allows each portable electronic book user to define his/her own notice board and document delivery address.

The information services system 20 preferably comprises a centralized bookshelf 30 associated with each portable electronic book 10 in the system. Each centralized bookshelf 30 contains all digital contents requested and owned by the associated portable electronic book 10. Each portable electronic book 10 user can permanently delete any of the owned digital contents from the associated centralized bookshelf 30. Since the centralized bookshelf 30 contains all the digital contents owned by the associated portable electronic book 10, these digital contents may have originated from different virtual bookstores. The centralized bookshelf 30 is a storage extension for the portable electronic book 10. Such storage extension is needed since the portable electronic book 10 has limited non-volatile memory capacity.

The user of the portable electronic book 10 can add marks, such as bookmarks, inking, highlighting and underlining, and annotations on a digital content displayed on the screen of the portable electronic book, then stores this marked digital content in the non-volatile memory of the electronic book 10. The user can also upload this marked digital content to the information services system 20 to store it in the centralized bookshelf 30 associated with the portable electronic book 10, for later retrieval. It is noted that there is no need to upload any unmarked digital content, since it was already stored in the centralized bookshelf 30 at the time it was first requested by the portable electronic book 10.

The information services system 20 further includes an Internet Services Provider (ISP) 34 for providing Internet network access to each portable electronic book in the system.

In the system 100 of FIG. 1, a digital content stored in the repository 50 of the virtual bookstore 40 or in the centralized bookshelf 30 may include numerical values which are stored as binary data in an endian format. If the requesting portable electronic book 10 runs on a processor platform which is incompatible with this endian format, then the byte-ordering of the binary data have to be converted to the other endian format.

Binary data are stored in a number of different record structures. Each structure has an arbitrarily complex combination of data types which may include 2-byte and 4-byte integer values, with and without alignment, NULL terminated strings, counted strings (1-byte and 2-byte counts), points (2-byte or 4-byte integer pairs), etc. In addition, these structures may contain nested lists of other structures. The nested lists may be counted lists or indefinite lists. Thus, due to the complexity of data structures, performing conversion of byte-ordering at the electronic book level is time-consuming and prone to errors. In addition, a change to a data structure will require every user of that data structure to change its conversion.

The present invention allows the byte-ordering conversion to be performed dynamically at the server end of the system of FIG. 1.

Figure 2:
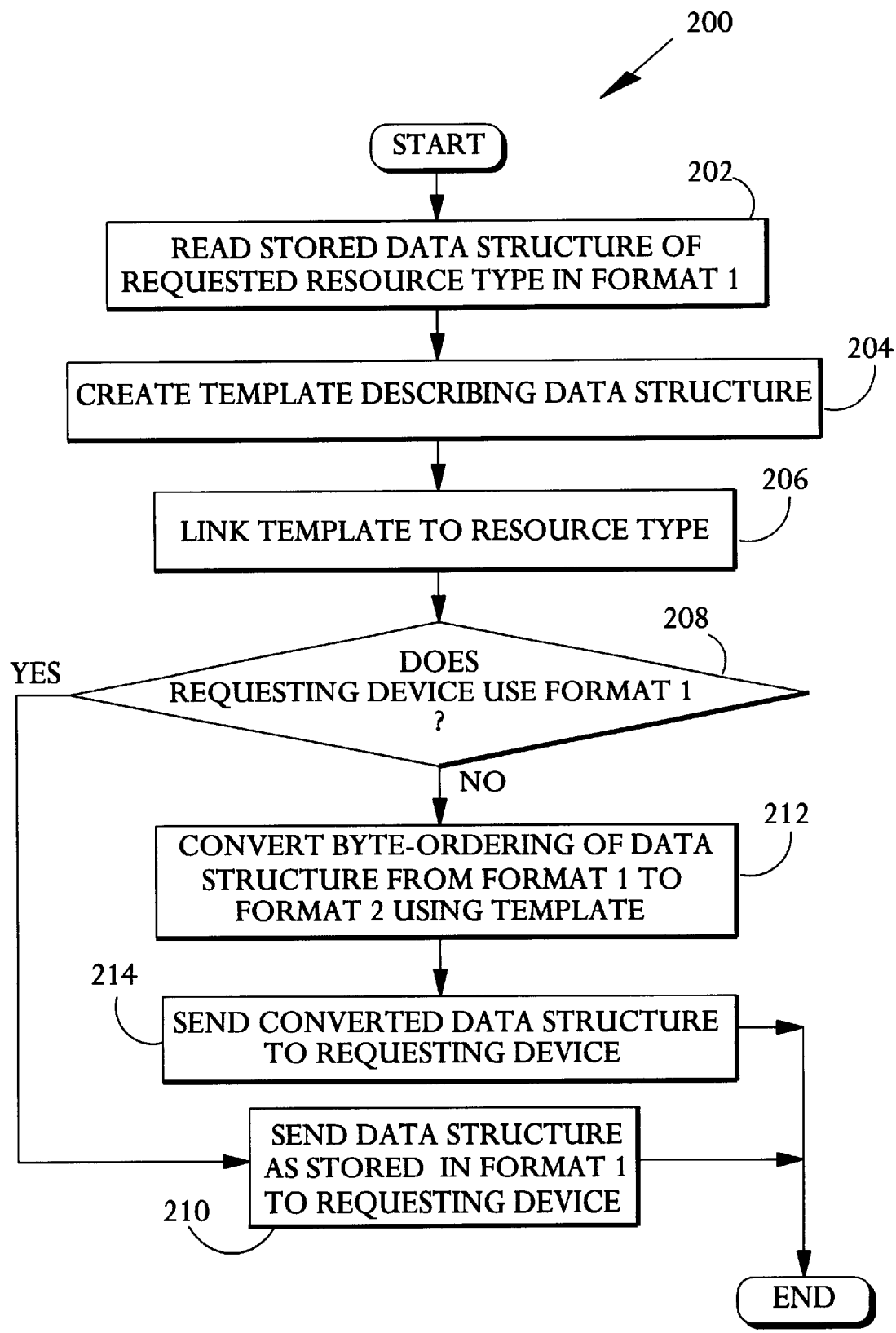
FIG. 2 is a flowchart illustrating one embodiment of the present invention.

FIG. 2 is a flowchart illustrating one embodiment of the present invention.

Upon START, the process 200 reads a data structure of a resource type requested by a device. The data structure is stored in format 1 in a simple database system of a server (Block 202). This simple database system is usually called the resource file system.

The process then creates a template describing the data structure of the resource type (Block 204). The structure of this template is in a format which is compatible with both format 1 and format 2. The template structure is a series of 1-byte values that represent individual data elements of the data structure of the resource type. This one-byte format is compatible to both endian formats discussed above, and does not require any conversion of the byte ordering.

The process 200 then links the template to the resource type (Block 206). The template is preferably stored in the same resource file as that of the resource type.

When a device requests the data of the resource type, process 200 determines whether the requesting device uses format 1 for byte-ordering (Block 208). If the requesting device uses format 1, then the data of the resource type as stored in the database system is sent to the requesting device (Block 210). Then, the process 200 is terminated.

If the requesting device does not use format 1, then process 200 converts the byte-ordering of the data structure of the resource type from format 1 to format 2 using the template (Block 212). Then, the process 200 is terminated.

One of the most important elements of the invention is the easily expandable template. Since the template structure is in the format of 1-byte values, byte swapping is not required, making it compatible to any platform. In addition, any change to a data structure layout require only a single change in the corresponding template for all users of that data.

FIG. 3 shows the description of some template values. The template data can be expanded to include more values.

Each template describes a resource type. For example, a resource type may have the following data structure, where a short is a 2-byte integer, a long is a 4-byte integer, and a char is a single byte:

| | |
|---|---|
| Short | v1; |
| Short | v2; |
| Char | v3; |
| Long | v4; |
| Short | v5; |

The template for this resource type is the following integer stream, using the byte values from FIG. 3:

2,2,1,4,3,2 or, equivalently, as text:

Short, Short, Byte, Short align, Long, Short

In this example, the template has one more value than the number of elements in the structure. The data for this structure may be aligned, that is, the individual data elements may need to start on 2-byte or 4-byte boundaries. In this example, the alignment is for 2 byte boundaries, forcing the "char" to take 2 bytes, but treating the second byte as padding to be disposed, not as data to be swapped.

The following are additional examples of data structures and their corresponding templates:

1. The following long aligned data structure:

| | |
|---|---|
| Short | s1; |
| Byte | flags; |
| Long point | lp1; | corresponds to the following template:

Short, byte, long align, long point

2. The following short aligned structure:

| | | |
|---|---|---|
| Short | sl; | |
| Char* | str1; | |
| Long | count; | // count for following string |
| Char* | str2; | | corresponds to the following template:

Short, NULL terminated string, short align, long counted string

3. The following short aligned data structure which includes a number of lists:

| | | | |
|---|---|---|---|
| Short | | | slc; |
| { | | | |
| | Short | | sl; |
| | Byte | | s2; |
| } | | | |
| long | | | llc; |
| { | | | |
| | long | | sllc; |
| | { | | |
| | | short | s3; |
| | | short | s4; |
| | } | | |
| | char* | | str; |
| } | | | |
| { | | | |
| | short | s4; | |
| | long | l1; | |
| } | | | | corresponds to the following template:

begin short counted list, short, byte, short align, end list, begin long counted list, begin long counted list, short, short, end list, NULL terminated string, short align, end list, begin indefinite list, short, long 4. The following data structure which consists of a simple list:

| | | |
|---|---|---|
| Short | | slc; |
| { | | |
| | long | l1; |
| | short | sl; |
| } | | | corresponds to the following template:

begin short counted list, long, short, end counted list

An example of such a simple data structure is a 2-element list with values {ABCD, EF}, {UVWX, YZ}. This data structure would be stored in persistent big endian memory as: 02ABCDEFUVWXYZ, where 02 indicates that there are two elements in the list, each element consists of a long integer followed by a short integer. After using the template to convert the byte-ordering of the data, the data will be stored in the memory of a little endian device as: 2ODCBAFEXWVUZY.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed is:

1. A method for providing a dynamically converted, byte-ordered data structure of a resource type to a device, the data structure being converted from a first format to a second format, the first format being incompatible with the second format, the method comprising the steps of:

(a) creating a template corresponding to the data structure of the resource type, the template having a structure in a third format, the third format being compatible with the first and second formats;

(b) linking the template to the resource type; and (c) converting automatically the byte-ordering of the data structure of the resource type from the first format to the second format using the template; and (d) sending the converted data structure of the resource type to the device.

2. The method of claim 1 wherein the template is expandable.

3. The method of claim 1 wherein the template structure comprises one-byte values.

4. The method of claim 1 wherein the first format is a big endian format and the second format is a little endian format.

5. The method of claim 1 wherein the template includes a value representing a byte.

6. The method of claim 1 wherein the template includes a value representing one selected from the list of a byte, a short integer, a long integer, a short align indicator, a long align indicator, a null terminated string, a short counted string, a byte counted string, a short point, a long point, an indefinite list, a start of a short counted list, a start of a long counted list, and an end of a counted list.

7. A system for dynamically converting byte-ordering of a data structure of a resource type from a first format to a second format, the first format being incompatible with the second format, the system comprising:

(a) a server including:

a resource file system having a database for storing the resource type, the resource type being stored in a first format, the resource file system creating a template corresponding to the data structure of the resource type, the template having a template structure in a third format, the third format being compatible with the first and second formats, the resource file system linking the template to the resource type; and (b) a device in electrical communication with the server, the device requesting the resource type in the second format;

wherein the resource file system automatically converts the byte-ordering of the data structure of the resource type from the first format to the second format using the template.

8. The system of claim 7 wherein the device is an electronic book.

9. The system of claim 7 wherein the server is a virtual bookstore.

* * * * *